United States Patent
Inoue

(10) Patent No.: US 7,307,746 B2
(45) Date of Patent: Dec. 11, 2007

(54) DATA PROCESSING APPARATUS, DATA PROCESSING METHOD, AND PROGRAM

(75) Inventor: Takashi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 901 days.

(21) Appl. No.: 10/397,312

(22) Filed: Mar. 27, 2003

(65) Prior Publication Data

US 2004/0068507 A1 Apr. 8, 2004

(30) Foreign Application Priority Data

Apr. 11, 2002 (JP) .............................. 2002-108638

(51) Int. Cl.
*G06F 3/12* (2006.01)
*G06K 15/00* (2006.01)

(52) U.S. Cl. .................. 358/1.15; 358/1.16; 707/3

(58) Field of Classification Search ............... 358/1.15, 358/1.16, 1.17, 1.18, 1.14, 1.13, 1.1, 1.9, 358/1.2, 407, 468, 1.6, 1.11, 403, 404, 444; 707/1, 3, 10, 100, 104.1, 200, 203, 204; 705/34, 705/16
See application file for complete search history.

(56) References Cited

U.S. PATENT DOCUMENTS

| 5,659,845 A * | 8/1997 | Krist et al. ..................... 399/79 |
| 5,956,698 A * | 9/1999 | Lacheze et al. ................ 705/34 |
| 6,396,848 B1 | 5/2002 | Ohta |
| 6,535,932 B1 | 3/2003 | Endoh et al. .................. 710/7 |
| 2002/0027673 A1 | 3/2002 | Roosen et al. |
| 2003/0011800 A1 | 1/2003 | Miyahara et al. |

FOREIGN PATENT DOCUMENTS

| EP | 0 795 999 A2 | 9/1997 |
| EP | 1 041 809 A2 | 10/2000 |
| EP | 1 087 578 A2 | 3/2001 |
| JP | 11-103322 A | 4/1999 |
| JP | 11-341212 A | 12/1999 |
| JP | 2001-014255 A | 1/2001 |
| JP | 2001-273099 A | 10/2001 |

OTHER PUBLICATIONS

European Search Report dated Mar. 8, 2007, issued in counterpart application No. 03251993.6-1228.

* cited by examiner

*Primary Examiner*—Dov Popovici
(74) *Attorney, Agent, or Firm*—Fitzpatrick, Cella, Harper & Scinto

(57) ABSTRACT

The user certainly grasps a processing result of a job requested to a peripheral apparatus during a job process or within a predetermined period after the job process. In the peripheral apparatus, function information showing a function which is used in the job process or information showing a processing situation of the job process is used as management information of the job, and the function information or information showing the processing result of the job process is managed as log information of the job during a period of time until an end of the job process. Management information or log information corresponding to designated job ID information is searched from the managed management information or log information.

10 Claims, 16 Drawing Sheets

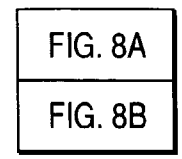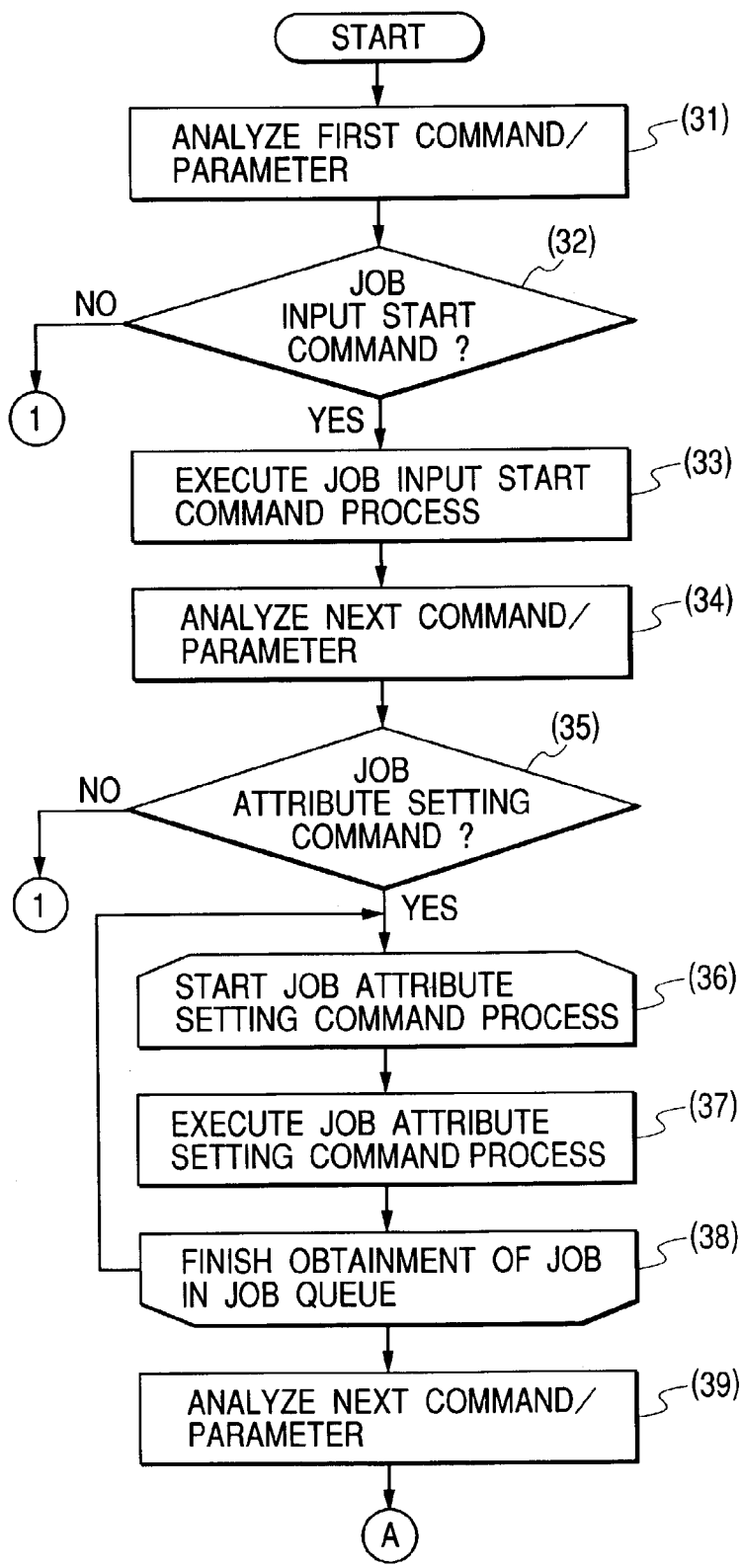

FIG. 16

MEMORY MEDIUM SUCH AS FD/CD-ROM, ETC.

| DIRECTORY INFORMATION |
|---|
| THE 1ST DATA PROCESSING PROGRAM<br>PROGRAM CODE GROUP CORRESPONDING TO STEPS IN FLOWCHART SHOWN IN FIG. 6 |
| THE 2ND DATA PROCESSING PROGRAM<br>PROGRAM CODE GROUP CORRESPONDING TO STEPS IN FLOWCHART SHOWN IN FIG. 7 |
| THE 3RD DATA PROCESSING PROGRAM<br>PROGRAM CODE GROUP CORRESPONDING TO STEPS IN FLOWCHART SHOWN IN FIG. 8 |
| THE 4TH DATA PROCESSING PROGRAM<br>PROGRAM CODE GROUP CORRESPONDING TO STEPS IN FLOWCHART SHOWN IN FIG. 9 |
| THE 5TH DATA PROCESSING PROGRAM<br>PROGRAM CODE GROUP CORRESPONDING TO STEPS IN FLOWCHART SHOWN IN FIG. 10 |
| THE 6TH DATA PROCESSING PROGRAM<br>PROGRAM CODE GROUP CORRESPONDING TO STEPS IN FLOWCHART SHOWN IN FIG. 11 |
| THE 7TH DATA PROCESSING PROGRAM<br>PROGRAM CODE GROUP CORRESPONDING TO STEPS IN FLOWCHART SHOWN IN FIG. 14 |
| |

MEMORY MAP IN MEMORY MEDIUM

FIG. 17

MEMORY MEDIUM SUCH AS
FD/CD-ROM, ETC.

| DIRECTORY INFORMATION |
|---|
| THE 6TH DATA PROCESSING PROGRAM<br>PROGRAM CODE GROUP CORRESPONDING TO STEPS<br>IN FLOWCHART SHOWN IN FIG. 11 |
| THE 7TH DATA PROCESSING PROGRAM<br>PROGRAM CODE GROUP CORRESPONDING TO STEPS<br>IN FLOWCHART SHOWN IN FIG. 14 |
| |

MEMORY MAP IN MEMORY MEDIUM

DATA PROCESSING APPARATUS, DATA PROCESSING METHOD, AND PROGRAM

BACKGROUND OF THE INVENTION

1. Field of the Invention

The invention relates to a data processing apparatus for processing a job, a job managing method, a computer-readable memory medium, and a program.

2. Related Background Art

Hitherto, in peripheral apparatuses such as printer, scanner, copying apparatus, FAX, and the like, a command to confirm a processing situation of a job requested by the user has been prepared, so that the user knows the processing situation and a processing result of the inputted job by using the command.

There is also a case where a mechanism such that the peripheral apparatus independently notifies the user of the processing situation and the processing result of the job has been prepared.

Further, there is also a case where by installing a recording medium (using a hard disk drive or the like) called a log into the peripheral apparatus, the processing result and various information are written into the recording medium after completion of the job process. The user can confirm the processing result or the like of the job by obtaining the log information.

SUMMARY OF THE INVENTION

However, job management resources in the peripheral apparatus are limited and a number of jobs cannot be permanently managed. Therefore, the job management in the peripheral apparatus is made only during a period of time from the reception of the job to its completion.

Therefore, the confirmation of the processing situation of the job is also valid only during a period of time from the reception of the job to its completion. After completion of the job process, the processing situation cannot be confirmed. There is a case where even if the peripheral apparatus independently notifies the user of the processing situation and the processing result of the job after completion of the job process, those information cannot be notified due to a defect or the like of a network or an apparatus on the user side.

Since the information which is recorded as a log is often a large amount of data, it takes a long time to obtain it and a load is also applied onto the network resources. Therefore, the user cannot easily obtain and analyze all logs.

In such a case, since the peripheral apparatus can receive jobs from a plurality of users, there is a problem such that if a plurality of users intend to obtain the logs, burdens on the peripheral apparatus and the network are doubled, or the like.

The invention is made to solve the above problems and it is an object of the invention that information regarding a job requested to the peripheral apparatus can be grasped by the user during a job process or a predetermined period of time after the job process without burdening system resources and compelling a traffic burden on the network.

BRIEF DESCRIPTION OF THE DRAWINGS

FIG. 16 is a diagram for explaining a memory map in a memory medium for storing various data processing programs which can be read out by the peripheral apparatus according to the invention; and FIG. 17 is a diagram for explaining a memory map in the memory medium for storing various data processing programs which can be read out by the PC according to the invention.

DETAILED DESCRIPTION OF THE PREFERRED EMBODIMENT

Figure 1:
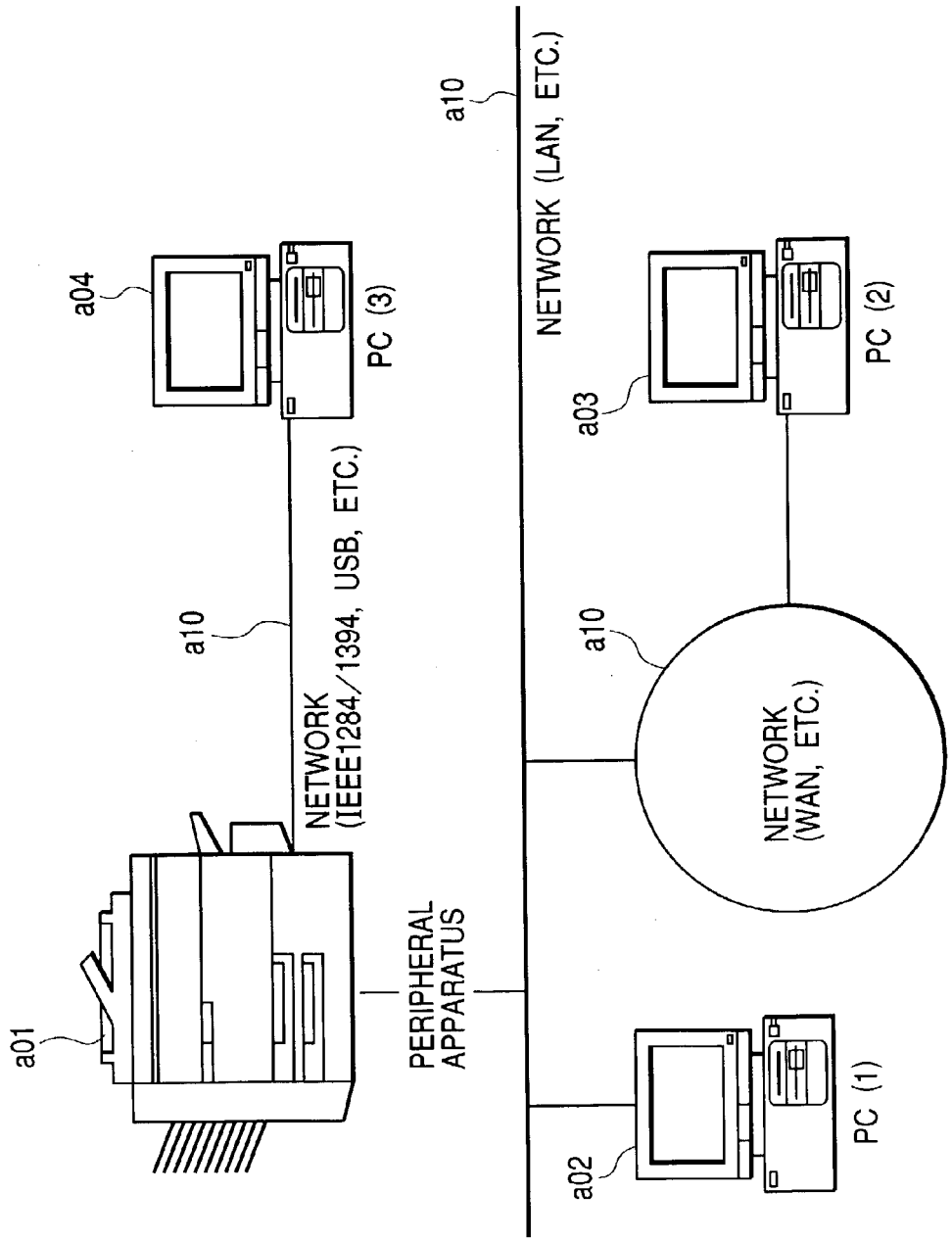
FIG. 1 is a constructional diagram showing an example of a data processing system to which a peripheral apparatus can be applied according to an embodiment of the invention.

FIG. 1 is a constructional diagram showing an example of a data processing system to which a peripheral apparatus can be applied according to an embodiment of the invention.

In FIG. 1, reference numeral a01 denotes a peripheral apparatus for executing a job process such as print, scan, copy, or FAX transmission and reception; a02 to a04 indicate PCs (personal computers) connected to the peripheral apparatus a01 via a network a10. As a connection by the network a10, there is a connection by LAN or WAN or a connection by IEEE1284/1394, USB, or the like.

FIG. 1 shows an example of the PC a02 connected to the peripheral apparatus a01 via the LAN, an example of the PC a03 connected to the peripheral apparatus a01 via the WAN, and an example of the PC a04 connected to the peripheral apparatus a01 via the IEEE1284/1394, USB, or the like. Apparatuses which are connected to the peripheral apparatus a01 are not limited to the PCs, but a workstation, other peripheral apparatuses, and other apparatuses can be also connected.

Control software called a controller is operating in the peripheral apparatus a01, executes the job process such as print, scan, copy, or FAX transmission and reception, and processes an inquiry about attribute information of the peripheral apparatus a01. A job receiving function, a job attribute setting function, a job managing function, a log recording function, a job searching function, a job search replying function according to the invention are functions which are processed by the controller. Job issuing software which operates in the peripheral apparatus a01 or the PCs a02 to a04 requests the controller in the peripheral apparatus a01 to execute the job process such as print, scan, copy, or FAX transmission and reception.

Similarly, job monitoring software which operates in the peripheral apparatus a01 or the PCs a02 to a04 monitors a situation and a result of the job process requested to the controller in the peripheral apparatus a01.

It is also possible to integrate the job issuing software and the job monitoring software and construct them as one software.

Figure 2:
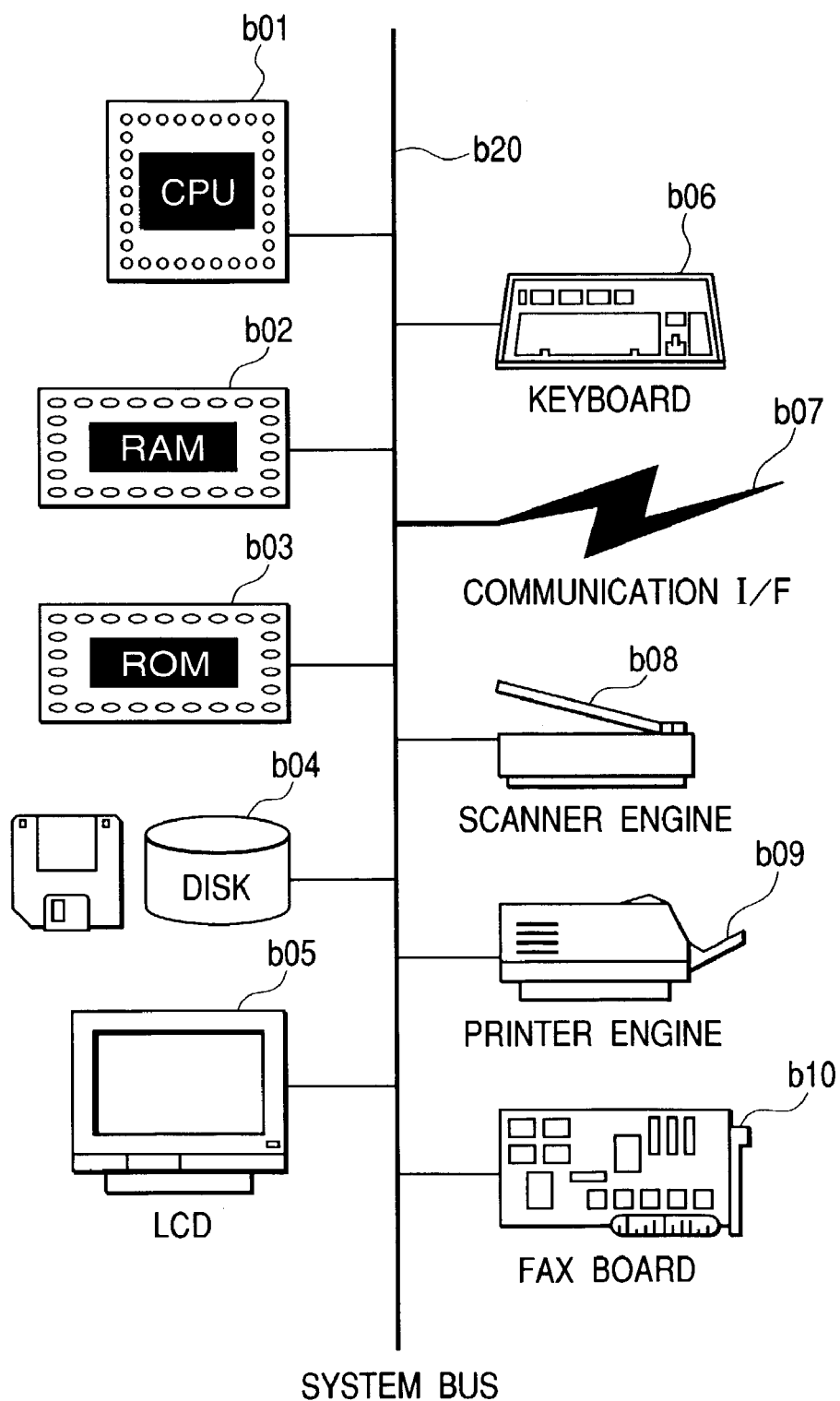
FIG. 2 is a schematic diagram showing a hardware construction of the peripheral apparatus shown in FIG. 1.

FIG. 2 is a schematic diagram showing a hardware construction of the peripheral apparatus a01 shown in FIG. 1.

In FIG. 2, in the peripheral apparatus a01, a CPU b01, a RAM b02, a ROM b03, a DISK b04, an LCD b05, a keyboard b06, a communication interface b07, a scanner engine b08, a printer engine b09, and a FAX board b10 are mutually connected via a system bus b20.

The CPU b01 is a main apparatus for executing the controller or the job issuing/monitoring software. Each of the units b02 to b10 constructing the peripheral apparatus a01 is controlled by the CPU b01, unless otherwise specified. A program for the controller or the job issuing/monitoring software has been stored in the ROM b03 or the DISK b04, is read out and stored into the RAM b02 as necessary, and is executed by the CPU b01.

Those programs execute processes such that information is displayed by the LCD b05, an instruction of the user is received from the keyboard b06, and the apparatus communicates with the outside via the communication interface b07.

Besides the programs for the controller and the job issuing/monitoring software, attribute information showing ability of the peripheral apparatus a01 and attribute information showing ability of the job which is processed by the peripheral apparatus a01 have been stored in the ROM b03 and DISK b04.

Attribute information showing a state of the peripheral apparatus a01, attribute information showing a state of the job which is processed by the peripheral apparatus a01, attribute information showing the function designated in association with the job process, job data serving as a processing target, and log information of the job whose process has been completed have been stored in the RAM b02 and DISK b04.

Further, executing order of jobs, attribute information of the jobs, and a job queue for managing the job data serving as a processing target have been stored in the RAM b02.

As a communication interface b07, for example, there is an interface by the Ethernet (registered trademark) or IEEE1284 or a communication interface by another medium.

The scanner engine b08, printer engine b09, and FAX board b10 are controlled by the controller and execute a scan job process, a print job process, and FAX transmission/reception job processes.

The peripheral apparatus a01 having the construction as mentioned above enables the scan job process to be executed by the scanner engine b08, the print job process to be executed by the printer engine b09, a copy job process to be executed by the scanner engine b08 and the printer engine b09, and the FAX reception job process and the FAX transmission job process to be executed by the scanner engine b08, the printer engine b09, and the FAX board b10, respectively.

Figure 3:
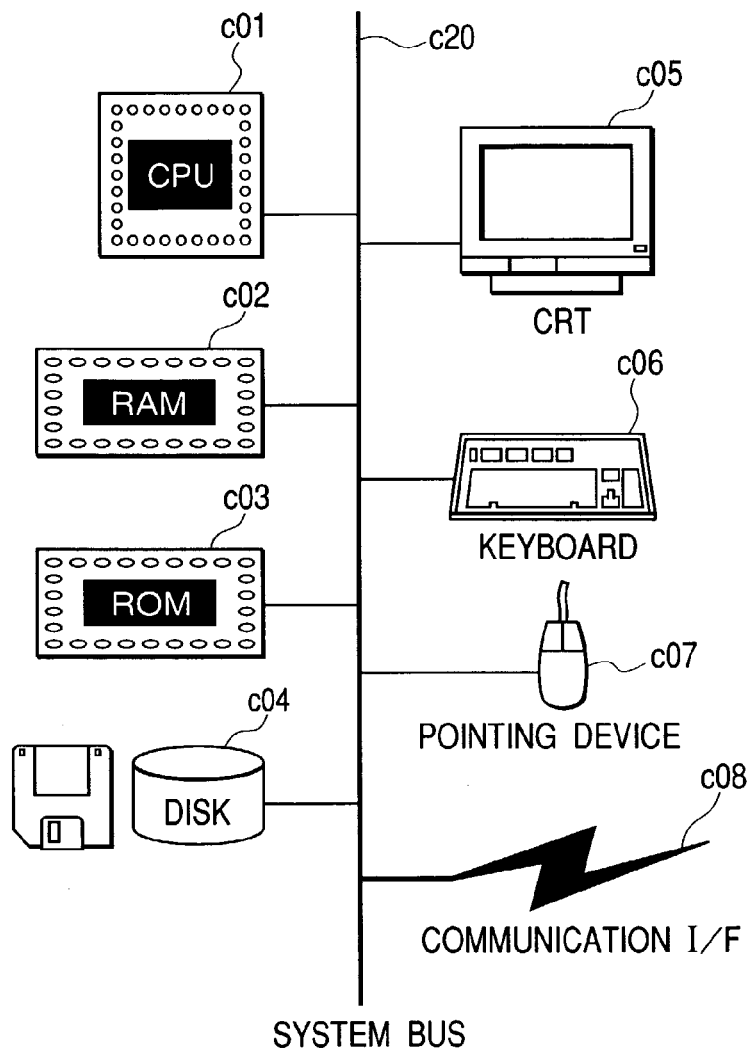
FIG. 3 is a schematic diagram showing a hardware construction of PCs shown in FIG. 1.

FIG. 3 is a schematic diagram showing a hardware construction of each of the PCs a02 to a04 shown in FIG. 1.

In FIG. 3, in the PCs a02 to a04, a CPU c01, a RAM c02, a ROM c03, a DISK c04, a CRT c05, a keyboard c06, a pointing device c07, and a communication interface c08 are mutually connected via a system bus c20.

The CPU c01 is a main apparatus for executing an Operating System (hereinafter, abbreviated to OS) or the job issuing/monitoring software for controlling the PCs a02 to a04. Each of the units c02 to c08 constructing the PCs a02 to a04 is controlled by the CPU c01, unless otherwise specified. A program for the OS or the job issuing/monitoring software has been stored in the ROM c03 or the DISK c04, is read out and stored into the RAM c02 as necessary, and is executed by the CPU c01.

Those programs execute the processes such that information is displayed by the CRT c05, an instruction of the user is received from the keyboard c06 or the pointing device c07, and the apparatus communicates with the outside via the communication interface c08.

Figure 4:
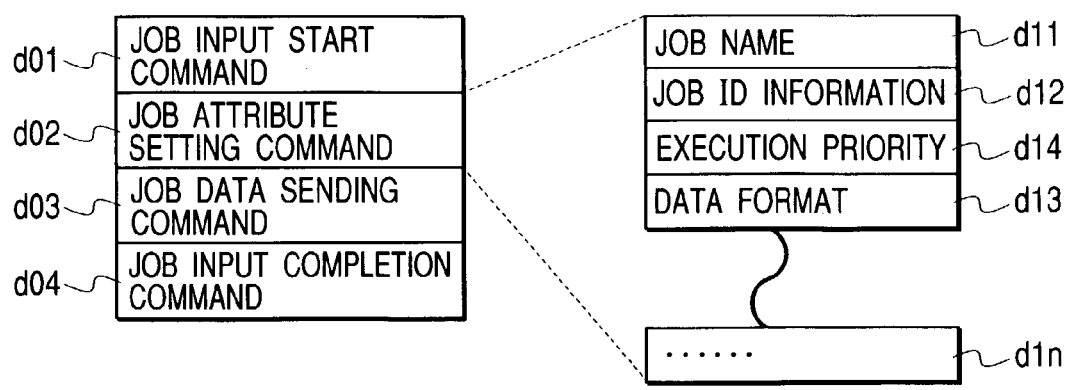
FIG. 4 is a diagram showing an example of a command group to instruct a job process in an information processing apparatus according to the invention.

FIG. 4 is a diagram showing an example of a command group (job execution request command) to instruct the job process in an information processing apparatus according to the invention.

The command group is formed by a processing flow shown in FIG. 11, which will be explained hereinlater, and sent from the job issuing software to the controller in the peripheral apparatus a01. Both of the case where the job issuing software operates in the peripheral apparatus a01 and the case where it operates in the PCs a02 to a04 are incorporated in a range to which the invention can be applied. The command group is processed in the peripheral apparatus a01 by processing flows in FIGS. 6 and 8.

In FIG. 4, the command group which instructs the job process is constructed by a job input start command d01, a job attribute setting command d02, a job data sending command d03, and a job input completion command d04.

The job input start command d01 is a command to notify the controller of the start of an input of the job. When the job input start command d01 is received, the controller starts preparation for executing the job process.

The job attribute setting command d02 is a command to set information for identifying the job and job attributes d11 to d1n for determining a function of the job. According to this command, a plurality of job attributes can be continuously set. In the diagram, a job name d11, job identification (ID) information d12, a data format d13, and an execution priority d14 are mentioned as job attributes. Further, there is also information such as job type, paper selection, the number of copies, and the like.

The job data sending command d03 is a command to transmit data such as image data or the like serving as a target of the job process. There is a case where the data serving as a target of the process is unnecessary in dependence on contents of the job, and in such a case, the present command can be omitted.

The job input completion command d04 is a command to show that all of the command group to instruct the job process have been sent.

A series of command group of the job input start command d01 to the job input completion command d04 is interpreted as one job execution request command.

Figure 5:
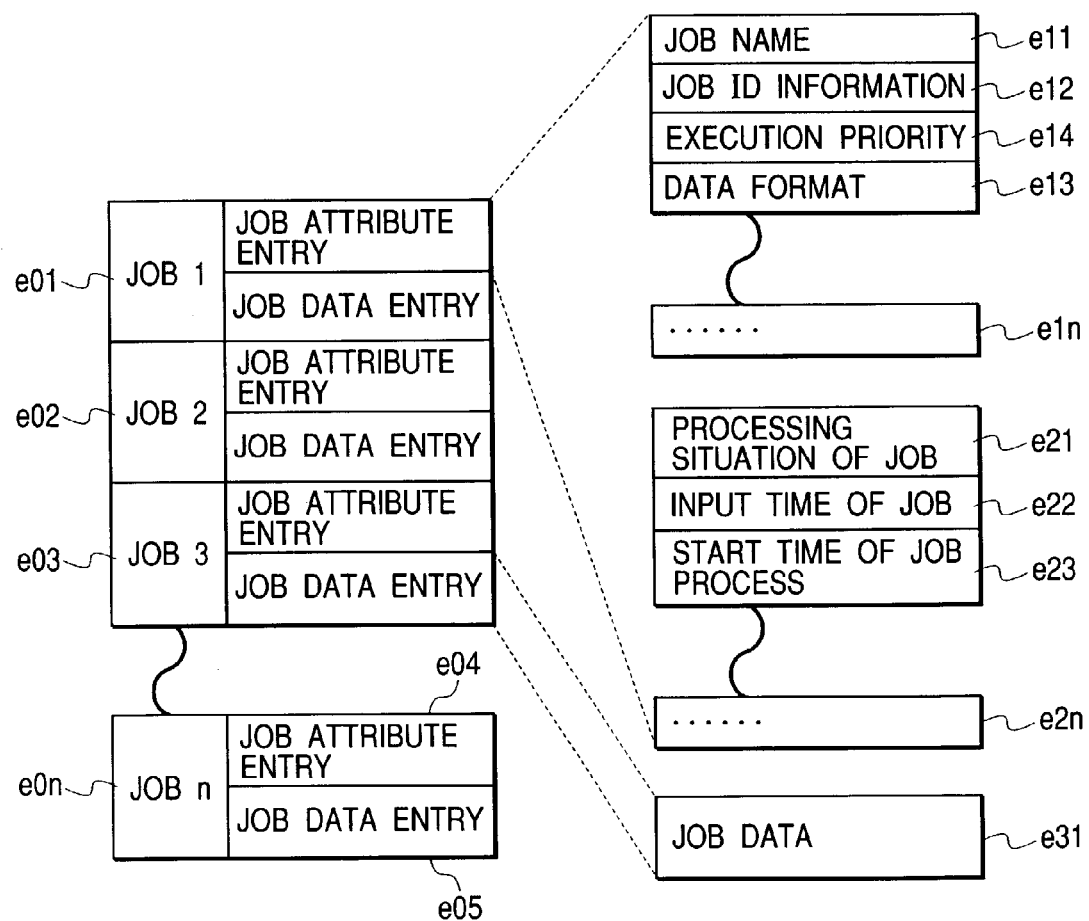
FIG. 5 is a diagram showing an example of a job queue held in a RAM of the peripheral apparatus shown in FIG. 1.

FIG. 5 is a diagram showing an example of management information of the jobs (hereinafter, referred to as a job queue) which are held in the RAM b02 in the peripheral apparatus a01 shown in FIG. 1. The peripheral apparatus a01 manages the management information of jobs by this table.

Figure 8B:
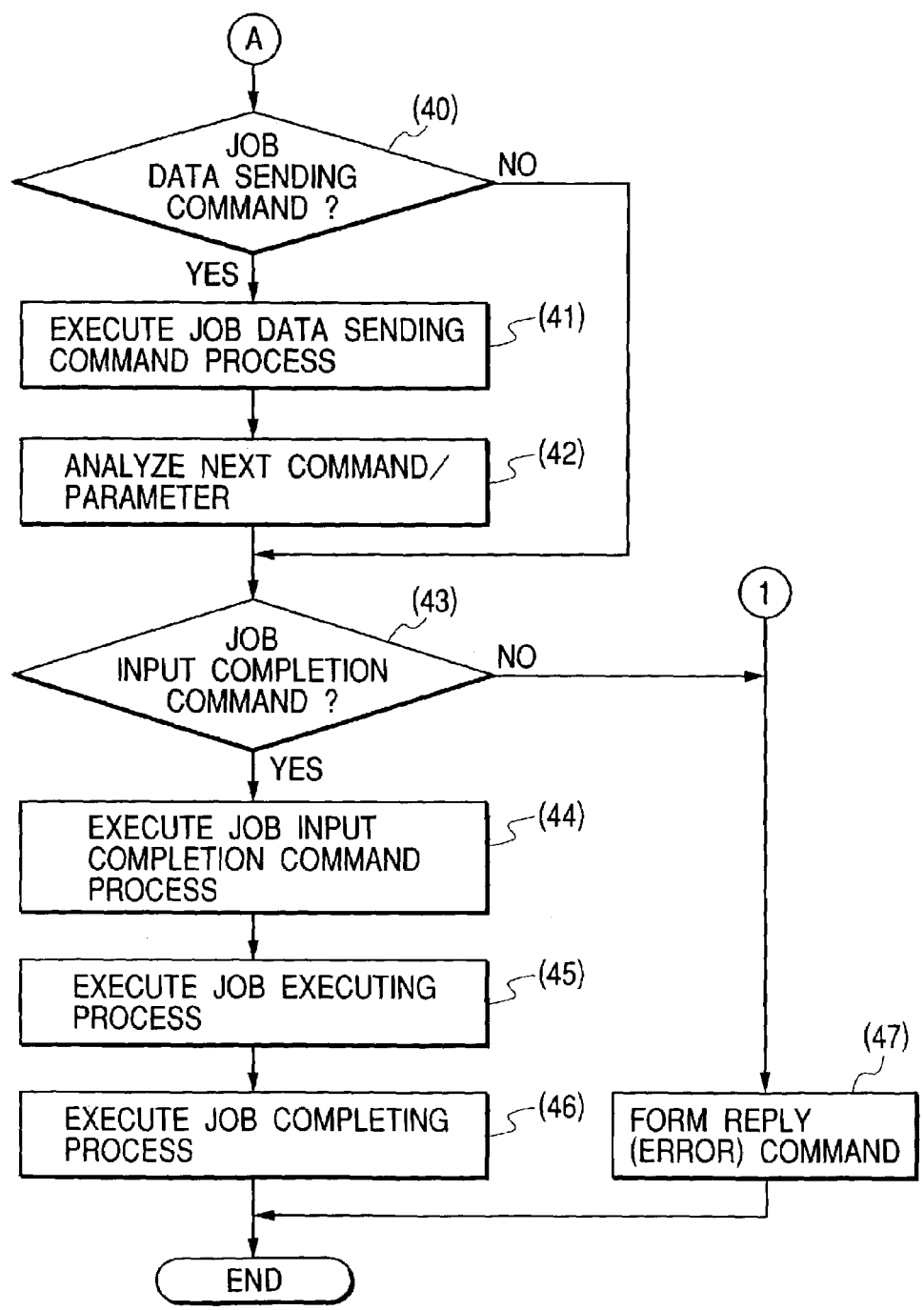
FIG. 8 is comprised of FIGS. 8A and 8B showing flowcharts of an example of a third data processing procedure according to the invention.

In FIG. 5, when the peripheral apparatus a01 receives the job input start command d01, one record in the job queue is added into the RAM b02 of the peripheral apparatus a01 by the processing flow shown in FIGS. 8A and 8B. After completion of the job process, the corresponding record in the job queue is deleted.

A job attribute entry e04 and a job data entry e05 are included in one record in the job queue.

The job attribute entry e04 is an entry to the table for holding the substances of various attributes regarding the job. Job attributes (e11 to e1n) instructed by the job issuing software by the job attribute setting command d02 and job attributes (e21 to e2n) which change in association with the job process have been stored in this table.

In the diagram, a job name e11, job ID information e12, a data format e13, and an execution priority e14 are mentioned as an example of the former job attributes and a processing situation e21 of the job, job input date/time (input time) e22 of the job, and start time e23 of the job process are mentioned as an example of the latter job attributes. Further, there are other various job attributes. Substances of the job attributes in the table can be stored in the RAM b02 of the peripheral apparatus a01 or in the DISK b04. It is also possible to construct in a manner such that the substances of the job attributes are stored in the job attribute entry e04 and can be easily accessed.

The job data entry e05 is an entry to a memory area of the data sent by the job issuing software by the job data sending command. The memory area of the job data can be provided in the RAM b02 in the peripheral apparatus a01 or in the DISK b04.

Figure 6:
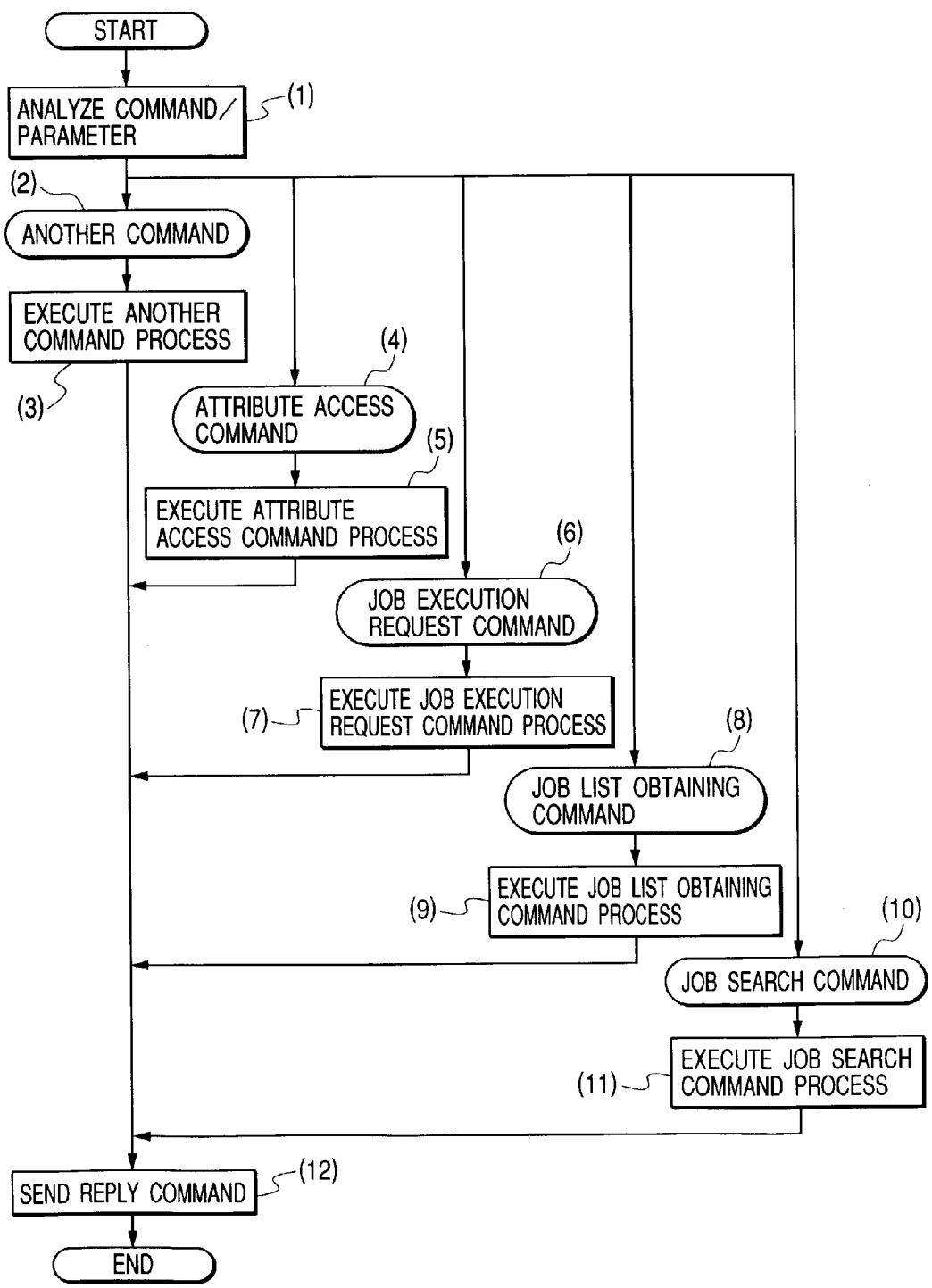
FIG. 6 is a flowchart showing an example of a first data processing procedure according to the invention.

FIG. 6 is a flowchart showing an example of a first data processing procedure according to the invention. This flowchart corresponds to the processing procedure for the commands which are processed in the peripheral apparatus a01 shown in FIG. 1. Those commands are issued by the job issuing/monitoring software. This processing flow is processed by the controller in the peripheral apparatus a01. Reference numerals (1) to (12) denote processing steps, respectively.

In step (1), the received command and its parameter are analyzed. If it is determined that the received command is an attribute access command, the processing routine advances to step (4) and subsequent steps. An attribute access command process, which will be explained in detail hereinafter, is executed (5). A reply command is sent (12). The processing routine is finished.

If it is determined by the analysis in step (1) that the received command is a job execution request command, the processing routine advances to step (6) and subsequent steps. A job execution request command process, which will be explained in detail hereinafter, is executed (7). The reply command is sent (12). The processing routine is finished.

If it is determined by the analysis in step (1) that the received command is a job list obtaining command, the processing routine advances to step (8) and subsequent steps. A job list obtaining command process, which will be explained in detail hereinlater, is executed (9). The reply command is transmitted (12). The processing routine is finished.

If it is determined by the analysis in step (1) that the received command is a job search command, the processing routine advances to step (10) and subsequent steps. A job search command process, which will be explained in detail hereinlater, is executed (11). The reply command is transmitted (12). The processing routine is finished.

If it is determined by the analysis in step (1) that the received command is a command other than the above-mentioned commands, the processing routine advances to step (2) and subsequent steps. Another command process is executed (3). The reply command is transmitted (12). The processing routine is finished. Since another command process is not directly concerned with the invention, it is not explained in detail here.

Figure 7:
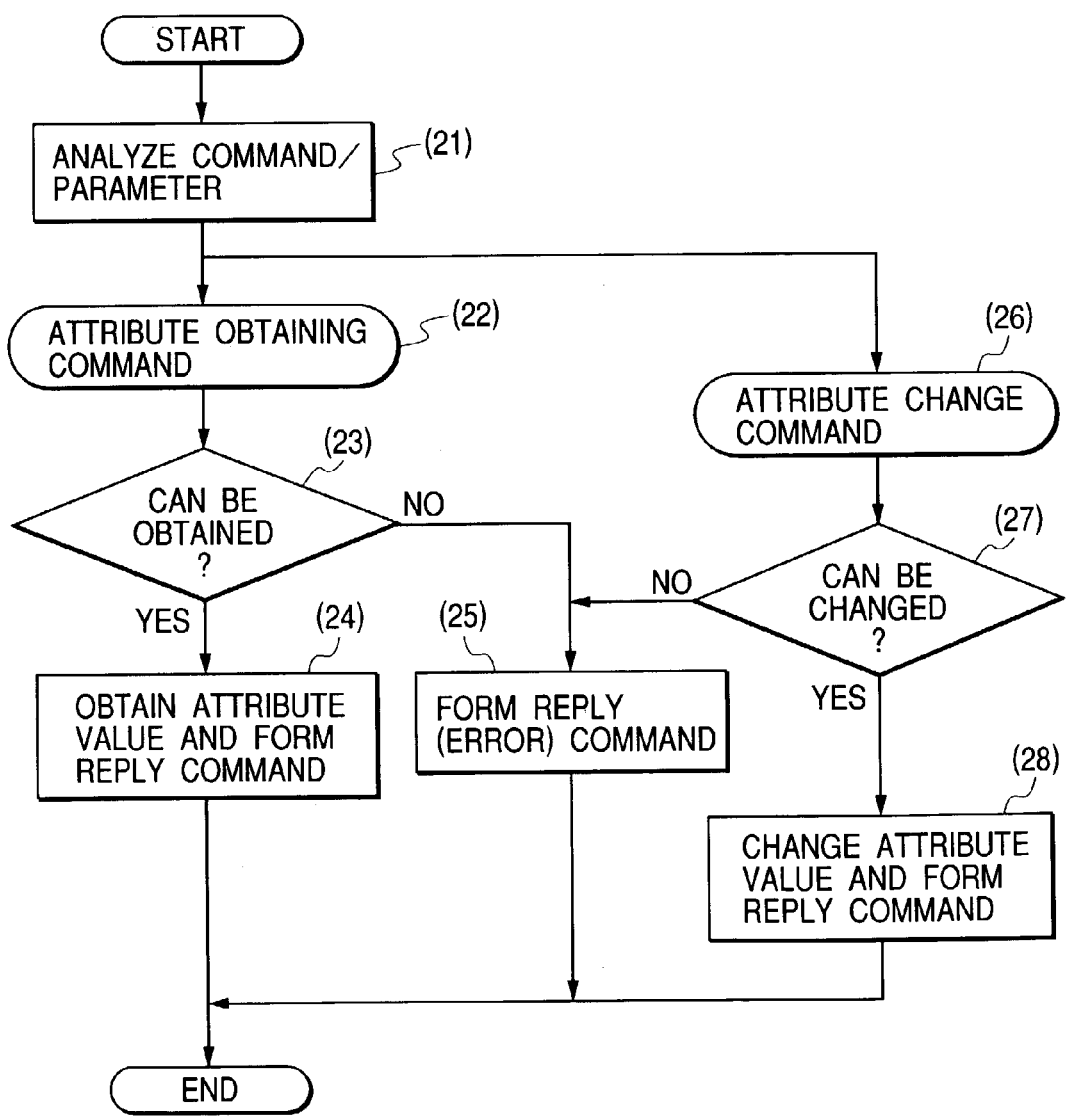
FIG. 7 is a flowchart showing an example of a second data processing procedure according to the invention.

FIG. 7 is a flowchart showing an example of a second data processing procedure according to the invention. This flowchart corresponds to the processing flow for the attribute access command which is processed in the peripheral apparatus a01 shown in FIG. 1. This processing flow explains step (5) shown in FIG. 6 in detail and is processed by the controller in the peripheral apparatus a01. Reference numerals (21) to (28) denote processing steps, respectively.

The processing steps in step (21) and subsequent steps relate to processes which are executed in the case where it is determined as a result of the analysis of step (1) shown in FIG. 6 that the received command is the attribute access command. First, in step (21), in a manner similar to step (1) shown in FIG. 6, the received command and its parameter are analyzed, thereby discriminating whether the received command is an attribute obtaining command or an attribute change command. If it is determined that the received command is the attribute obtaining command (22), whether the designated attribute is an attribute which can be obtained or not is discriminated in step (23). If it is determined that the designated attribute is the attribute which can be obtained, step (24) follows. If it is determined that the designated attribute is not the attribute which can be obtained, step (25) follows.

In step (24), the RAM b02, ROM b03, and DISK b04 of the peripheral apparatus a01 are properly accessed in accordance with the designated attribute and the designated attribute value is obtained. As attributes which can be obtained here, there are included: attribute information showing ability of the peripheral apparatus a01; attribute information showing ability of the job which is processed by the peripheral apparatus a01; attribute information showing a state of the peripheral apparatus a01; attribute information showing a state of the job which is processed by the peripheral apparatus a01; attribute information showing a function designated in association with the job process; and the like. Naturally, the job ID information e12 and the processing situation e21 of the job shown in FIG. 5 are also included as attributes which can be obtained. After that, the reply command in which the obtained attribute value has been set is formed. The processing routine is finished.

If it is determined as a result of analysis in step (21) that the received command is the attribute change command (26), whether the designated attribute is an attribute which can be changed (job name e11, execution priority e14, etc.) or not is discriminated in step (27). If it is determined that the designated attribute is the attribute which can be changed, step (28) follows. If it is determined that the designated attribute is not the attribute which can be changed, step (25) follows.

In step (28), the RAM b02 and the DISK b04 of the peripheral apparatus a01 are properly accessed in accordance with the designated attribute and the attribute is changed to the designated attribute value. Naturally, the attributes which can be changed include the attributes (job name e11, execution priority e14, etc,) which can be changed among the various attributes described in FIG. 5. After that, the reply command in which a result of the change has been set is formed. The processing routine is finished.

In step (25), an error process in the case where the designated attribute cannot be obtained nor changed is executed. A reply command indicative of the error is formed here and the processing routine is finished.

After completion of the processing flow, step (12) shown in FIG. 6 follows and the reply command is sent. In this manner, the command processing flow in the peripheral apparatus a01 is completed.

FIG. 8 is comprised of FIGS. 8A and 8B showing flowcharts of an example of a third data processing procedure according to the invention. This procedure corresponds to the processing flow for the job execution request command which is processed in the peripheral apparatus a01 shown in FIG. 1. This processing flow corresponds to the detailed procedure in step (7) shown in FIG. 6 and is processed by the controller in the peripheral apparatus a01. Reference numerals (31) to (47) indicate processing steps, respectively.

The job execution request command is constructed by a plurality of commands such as job input start command d01, job attribute setting command d02, job data sending command d03, and job input completion command d04. The process is executed with respect to each command.

First, in step (31), the first command and its parameter are extracted and analyzed. In step (32), whether the command extracted in step (31) is the job input start command d01 or not is discriminated. If it is determined that it is the job input start command d01, step (33) follows. If it is determined that it is not the job input start command d01, step (47) follows.

In step (33), the process regarding the job input start command d01 is executed. In this step, a record of the job queue is added for a new job and initialized are the job attribute entry and the job data entry in the record, and the table for storing the substances of the job attributes.

Subsequently, in step (34), the next command subsequent to the job input start command d01 and its parameter are extracted and analyzed. The command subsequent to the job input start command d01 has to be one or more job attribute setting commands d02.

In step (35), whether the command extracted in step (34) is one or more job attribute setting commands d02 or not is discriminated. If it is determined that the command is the job attribute setting command d02, step (36) follows. If it is determined that the command is not the job attribute setting command d02, step (47) follows.

In steps (36) to (38), the process is repetitively executed with respect to each of the plurality of received job attribute setting commands d02.

Step (36) shows the start of the repetitive processes mentioned above. In step (37), a process regarding the job attribute setting command d02 is executed. The designated attribute is stored into a job attribute table in the RAM b02 or DISK b04 of the peripheral apparatus a01. This job attribute table is referred to from the attribute entry e04 in the job queue corresponding to the job. Necessary job function is prepared in accordance with the designated attribute value. Naturally, the job ID information e12 is also included in the attributes which are stored here.

Next step (38) shows the end of the repetitive processes mentioned above. The presence or absence of further another job attribute setting command d02 is discriminated here. If it is determined that another job attribute setting command d02 exists, the processing routine is returned to step (36). If it is determined that another job attribute setting command d02 does not exist, step (39) follows.

In step (39), the next command subsequent to the job attribute setting command d02 and its parameter are extracted and analyzed.

The command subsequent to the job attribute setting command d02 has to be the job data sending command d03.

The job data transmission can be omitted in accordance with the type of job. In this case, the job input completion command d04 follows the job attribute setting command d02.

In next step (40), whether the command extracted in step (39) is the job data sending command d03 or not is discriminated. If it is determined that the command is the job data sending command d03, step (41) follows. If it is determined that the command is not the job data sending command d03, step (43) follows.

In step (41), a process regarding the job data sending command d03 is executed. In this step, the transmitted job data is stored into a memory area in the RAM b02 or DISK b04 of the peripheral apparatus a01. This memory area is referred to from the job data entry e05 in the job queue corresponding to the job. A function of the necessary job is prepared in accordance with the designated job data.

Subsequently, in step (42), the next command subsequent to the job data sending command d03 and its parameter are extracted and analyzed.

In step (43), the command extracted in step (39) or (42) is the job input completion command d04 or not is discriminated. If it is determined that the command is the job input completion command d04, step (44) follows. If it is determined that the command is not the job input completion command d04, step (47) follows.

In step (44), a process regarding the job input completion command d04 is executed. In this step, various resources necessary for job execution are assured in the peripheral apparatus a01 in accordance with the designated job function and job data and preparation for executing a job process such as decision of the executing order or the like is made.

As for the preparation for executing the job process, it is possible to construct in a manner such that the preparation is sequentially made at the stage (step (36) and subsequent steps) where the necessary resources could be determined in order to efficiently progress the process.

Subsequently, in step (45), the job executing process is executed in the peripheral apparatus a01 in accordance with the designated job function and job data.

There is also a case where the above processing step is not soon executed but is executed when the apparatus enters an executable stage in dependence on the attribute designation regarding scheduling of the job or a waiting state of another job in the job queue. In order to efficiently progress the process, it is also possible to construct the apparatus such that this processing step is precedently executed at a stage where the necessary resources could be assured (after step (36) and subsequent steps).

In next step (46), various post processes after completion of the job process are executed. First, the various resources used in the job process are released. After that, an end result of the job, the attribute values necessary for specifying the job, and the like are recorded as log information provided in the RAM b02 or DISK b04 of the peripheral apparatus a01.

Figure 13:
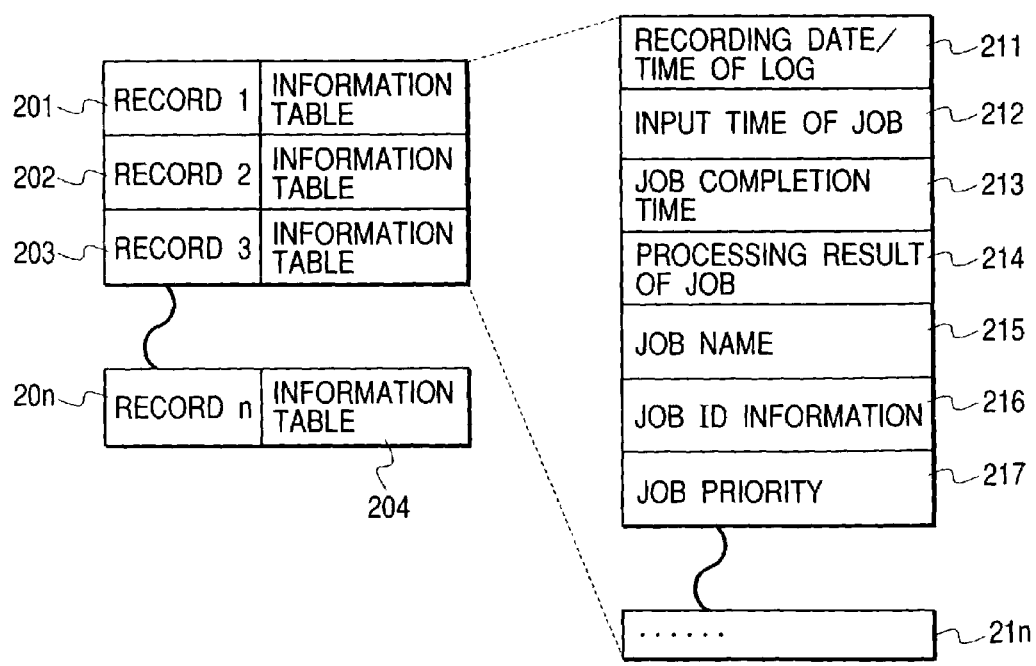
FIG. 13 is a diagram showing an example of log information for recording generation of a specific event occurring in the peripheral apparatus shown in FIG. 1 and information associated with the event generation.

Naturally, job ID information 216 and a processing result 214 of the job, which will be explained in the log information shown in FIG. 13 are also included in the information which is recorded here. Further, the record of the job queue corresponding to the completed job is deleted. Releasing processes of the job attribute entry e04, the job data entry e05, the table for storing the substance of the job attributes, and the memory area of the job data, and the like are executed. After those processes are executed, the present processing flow is finished.

In step (47), an error process in the case where the commands are not transmitted in correct order is executed.

In this case, a reply command showing an error is formed and this processing flow is finished without executing the job process. It is also possible to construct in a manner such that the subsequent command reception is skipped until the correct command is obtained.

After step (33), the processing state of the job changes in accordance with each process. Naturally, the processing situation e21 of the job, the input time e22 of the job, the start time e23 of the job process, and the like which have been stored in the job attribute table of the job queue are successively updated in accordance with the change in job processing state.

After completion of the present processing flow, the processing routine advances to step (12) shown in FIG. 6 and the reply command is transmitted. In this manner, the command processing flow in the peripheral apparatus a01 is completed.

Figure 9:
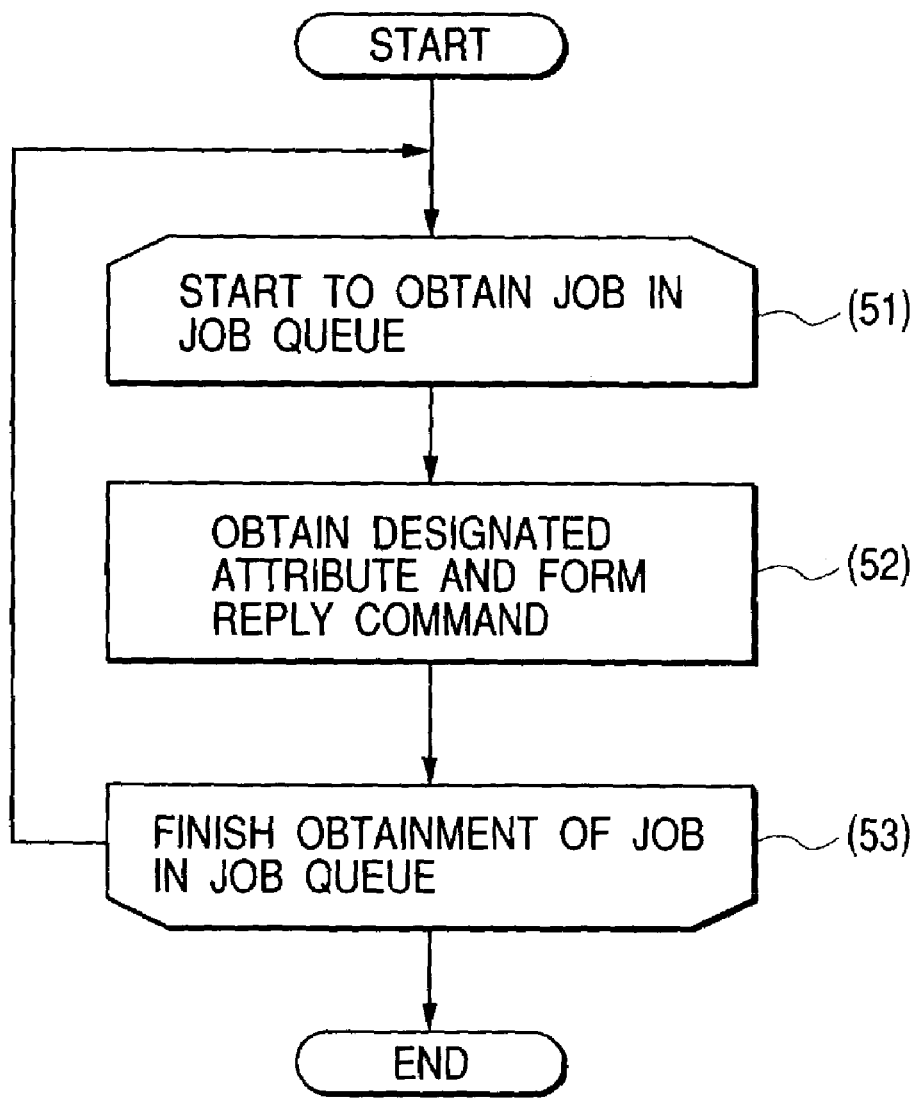
FIG. 9 is a flowchart showing an example of a fourth data processing procedure according to the invention.

FIG. 9 is a flowchart showing an example of a fourth data processing procedure according to the invention. This flowchart corresponds to the processing flow for the job list obtaining command which is processed in the peripheral apparatus a01 shown in FIG. 1. This processing flow describes step (9) shown in FIG. 6 in detail and is processed by the controller in the peripheral apparatus a01. Reference numerals (51) to (53) denote processing steps, respectively. It is assumed that in steps (51) to (53), the processes are repetitively executed with respect to all jobs under execution or in an execution waiting state in the job queue in the RAM b02 of the peripheral apparatus a01.

First, in step (51), the repeating process is started. In step (52), the process for obtaining the job attribute designated by the job list obtaining command is executed.

The controller accesses the record regarding the job under execution or in the execution waiting state in the job queue and the value of the designated job attribute is extracted via the job attribute entry e04 and set into the reply command. Naturally, the job ID information e12 and the processing situation e21 are also included in the attribute which can be obtained here.

It is also possible to construct in a manner such that a plurality of attributes can be obtained by the job list obtaining command. If the designated attribute cannot be obtained, it is also possible to construct in a manner such that the reply command showing the error is formed as described in the attribute access command process in FIG. 7. Further, if only a part of the plurality of designated attributes cannot be obtained, it is also possible to construct in a manner such that the values of the attributes excluding only such a partial attributes can be obtained.

In next step (53), the repeating process is finished. In this step, whether the record corresponding to the job under execution or in the execution waiting state still remains in the job queue or not is discriminated. If it is determined that the record corresponding to the job still remains, the processing routine is returned to step (51). If there is no record corresponding to the job, the present processing flow is finished.

After completion of the present processing flow, the processing routine advances to step (12) in FIG. 6 and the reply command is sent. In this manner, the command processing flow in the peripheral apparatus a01 is completed.

Figure 10:
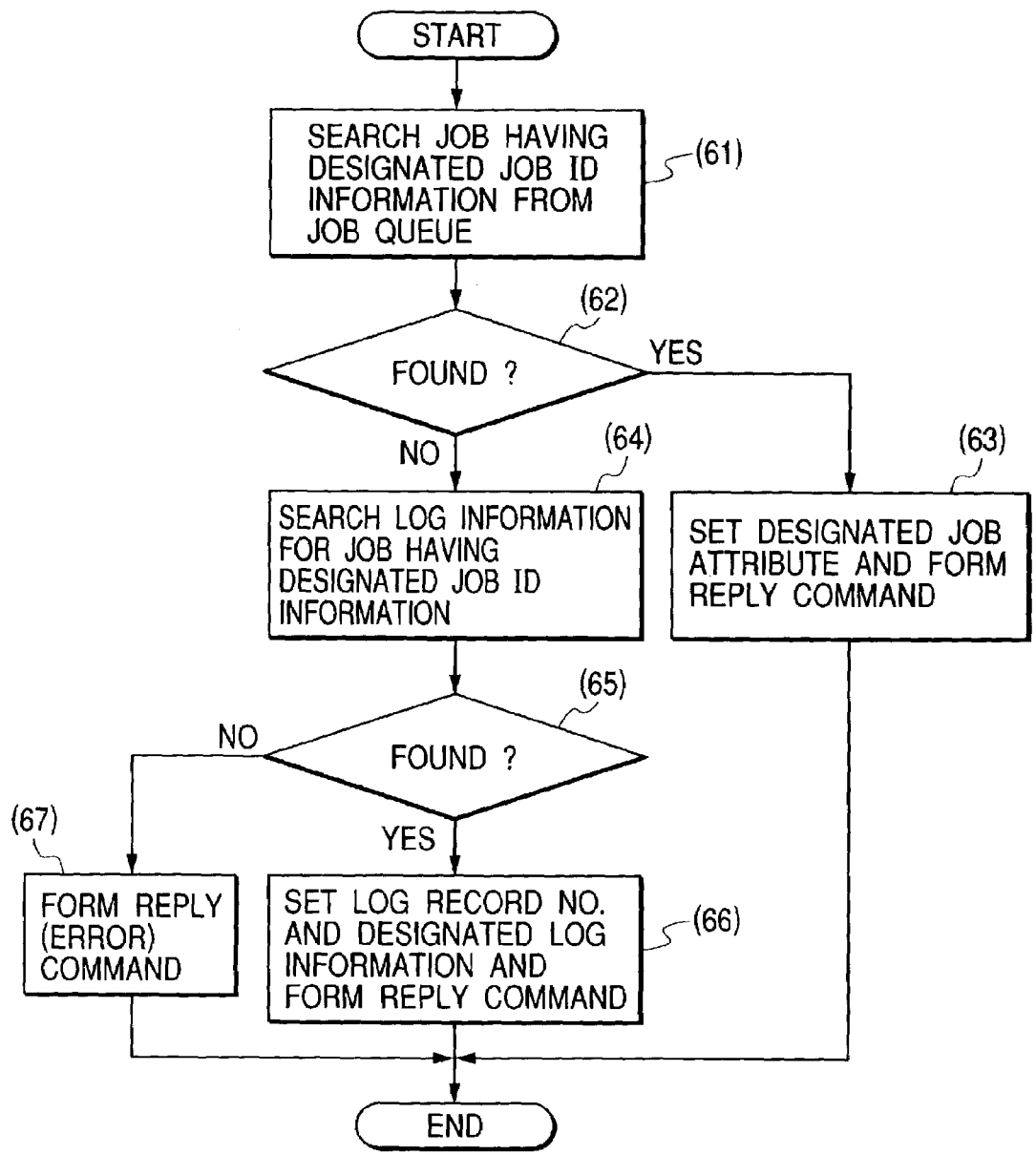
FIG. 10 is a flowchart showing an example of a fifth data processing procedure according to the invention.

FIG. 10 is a flowchart showing an example of a fifth data processing procedure according to the invention. This flowchart corresponds to the processing flow for the job search command which is processed in the peripheral apparatus a01 shown in FIG. 1. This processing flow describes step (11) shown in FIG. 6 in detail and is processed by the controller in the peripheral apparatus a01. Reference numerals (61) to (67) denote processing steps, respectively.

First, in step (61), the job in which the job ID information designated by the job search command has been set is searched from the job queue in the peripheral apparatus a01. The controller accesses each record regarding the job under execution or in the execution waiting state in the job queue and obtains the job ID information e12 via the job attribute entry e04.

In next step (62), the presence or absence of the job in which the job ID information e12 obtained in step (61) and the job ID information designated by the command coincide is discriminated. If it is determined that the job in which the job ID information coincides exists, step (63) follows. If it is determined that the coincident job does not exist, step (64) follows.

In step (63), information showing that the job having the designated job ID information has been still managed in the job queue of the peripheral apparatus a01 and a processing situation (job attribute e21) of the job are set into the replay command. The present processing flow is finished.

In step (64), the job in which the job ID information designated by the job search command has been set is searched from the log information in the peripheral apparatus a01. The controller accesses all records of the log information and obtains the job ID information 216 via an information table 204 shown in FIG. 13.

Subsequently, in step (65), the presence or absence of the job in which the job ID information 216 obtained in step (63) and the job ID information designated by the command coincide is discriminated. If it is determined that the coincident job exists, step (66) follows. If it is determined that the coincident job does not exist, step (67) follows.

In step (66), information showing that the job having the designated job ID information has been found in the log information, the record number of the log information, and the processing result 214 of the job are set into the replay command. The present processing flow is finished.

In step (67), information showing that the job having the designated job ID information is not found both in the job queue and in the log information in the peripheral apparatus a01 is set into the replay command. The present processing flow is finished.

After the end of the present processing flow, step (12) shown in FIG. 6 follows and the reply command is sent. In this manner, the command processing flow in the peripheral apparatus a01 is completed.

Figure 11:
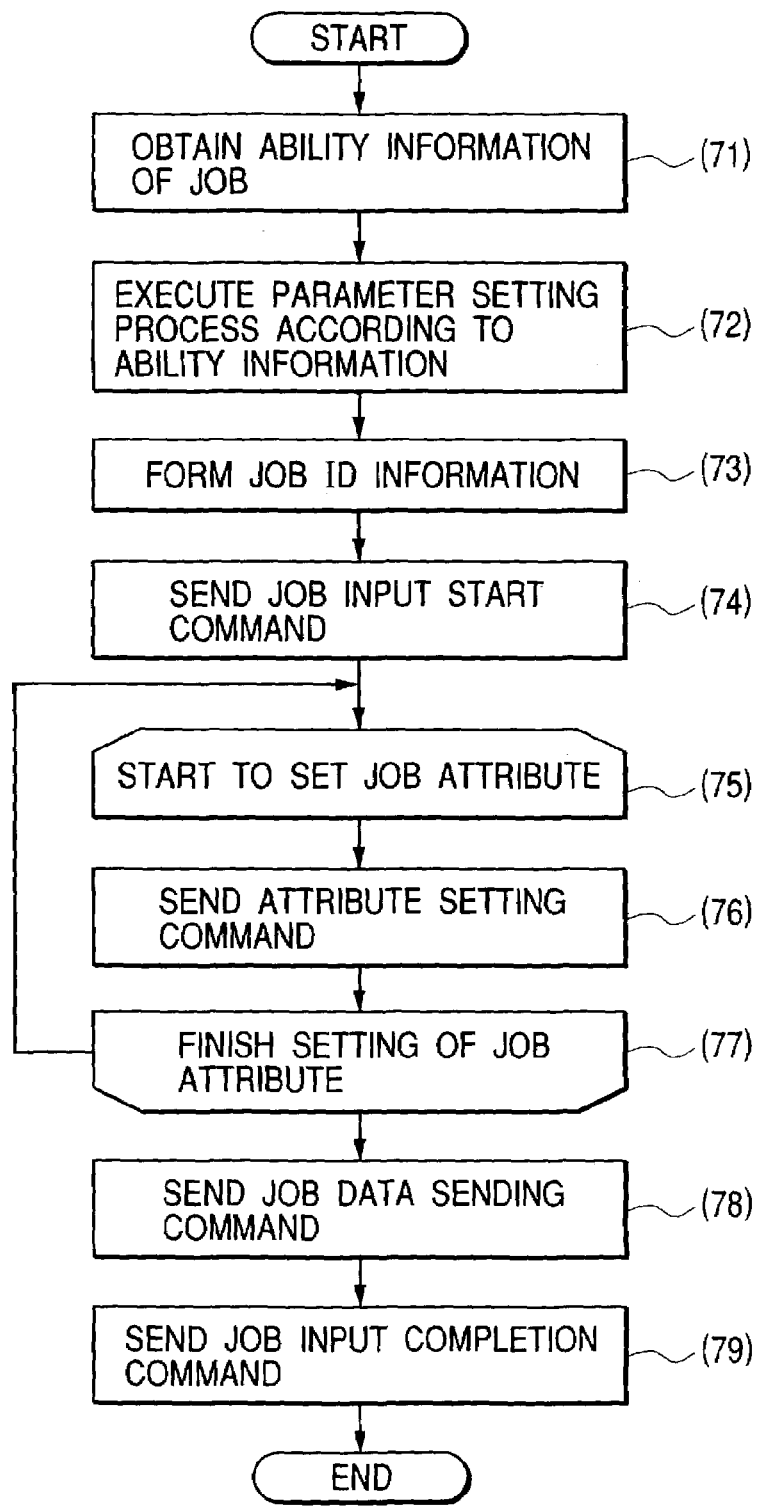
FIG. 11 is a flowchart showing an example of a sixth data processing procedure according to the invention.

FIG. 11 is a flowchart showing an example of a sixth data processing procedure according to the invention. This flowchart corresponds to the processing flow for the job input command which is processed in the PC shown in FIG. 1. The job inputting process is executed by the job issuing software and this processing flow is processed by the job issuing software. Both of the case where the job issuing software operates in the peripheral apparatus a01 and the case where it operates in the PCs a02 to a04 are incorporated in a range to which the invention can be applied. Reference numerals (71) to (79) denote processing steps, respectively.

First, in step (71), information regarding the job processing ability of the peripheral apparatus a01, such as mode which can be designated into the job input start command, job attribute which can be designated into the job attribute setting command, and the like is obtained. The ability information is obtained by sending the attribute obtaining command to the peripheral apparatus a01. Instead of obtaining all ability information each time the job issuing process is executed, it is also possible to construct in a manner such that the ability information is previously obtained by some means upon activation or the like of the job issuing software and, in this processing step, the minimum items about whether the ability of the apparatus has been changed or not and the like are checked.

In next step (72), the ability information obtained in step (71) is presented to the user, thereby making him to set the mode, functions, and the like which are necessary for job input. As functions which are set here, there are the name of the job, execution priority, sheet selection, the number of copies, and the like and they correspond to the job attributes, respectively. If there is a parameter of the job input command, it can be also set here.

Figure 12:
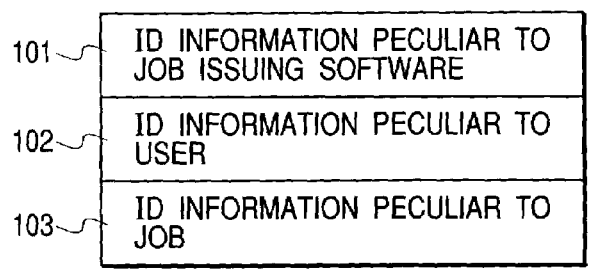
FIG. 12 is a diagram showing an example of contents of job ID information shown in FIG. 5.

In step (73), the job ID information shown in FIG. 12 is formed. This information is used for identifying the job on the user side who requests the peripheral apparatus a01 to input the job. In step (76) and subsequent steps, it is set as a job attribute (d12 in FIG. 5).

In step (74), the job input start command is transmitted to the controller in the peripheral apparatus a01 together with the parameter set in step (72).

Subsequently, in steps (75) to (77), the processes are repetitively executed until the function setting (attribute setting) necessary for the user's desired job process is completed.

In step (75), the above repetitive process is started. In next step (76), the job attribute setting command accompanied with the job attribute set in step (72) and the job ID information formed in step (73) is sent to the controller of the peripheral apparatus a01. In step (77), the above repetitive process is finished. In this step, whether the job attribute to be set still remains or not is discriminated. If it is determined that the job attribute to be set still remains, the processing routine is returned to step (75). If it is determined that there is no job attribute to be set, the processing routine advances to step (78).

In step (78), data serving as a target of the job process, such as image data formed by the application is sent to the controller in the peripheral apparatus a01 by the job data sending command.

However, since the job data is unnecessary in dependence on the contents of the job, the present processing step can be omitted in such a case.

First, in step (79), the job input completion command indicative of the completion of the transmission of the command group for requesting the job execution is sent. The processing flow is finished.

By the above processing flow, the command group shown in FIG. 4 is transmitted to the controller in the peripheral apparatus a01.

FIG. 12 is a diagram showing an example of contents of the job ID information shown in FIG. 4.

In FIG. 12, the contents of the job ID information correspond to the job ID information d12 which is stored as a job attribute and the job ID information 216 (refer to FIG. 13) which is recorded as log information. The contents of the job ID information are also used as parameters of the attribute setting command, attribute obtaining command, job attribute setting command, job list obtaining command, and job search command.

The job ID information is used to identify the job on the user side who requests the peripheral apparatus a01 to input the job and is formed by the job issuing software.

There is a possibility such that there are a plurality of types of job issuing software using the peripheral apparatus a01. There is also a possibility such that there are a plurality of users who use the specific job issuing software among them. Further, there is a possibility such that there are a plurality of jobs issued by the specific user.

Therefore, on the system which uses the peripheral apparatus a01, information for specifying and identifying the job issuing software which has inputted the job, the user who requested the job input (or the PC which is used by the user), and the job itself inputted by the job issuing software is necessary.

ID information 101 which is peculiar to the job issuing software is information for specifying and identifying the job issuing software itself. It is determined by the developer of the job issuing software. To distinguish it from job issuing software formed by another developer, there is a method of using a UUID (Universal Unique IDentifier) which is formed by using an IP address or time information, or the like.

ID information 102 which is peculiar to the user is information for specifying and identifying the user himself who uses the job issuing software. It is determined by a platform on which the job issuing software operates. To distinguish him from other users, there is a method of using user IDs allocated to the users so as to identify each user in the system or a method of using the UUID or the like which is formed by using the IP address or time information of the platform on which the job issuing software operates.

ID information 103 which is peculiar to the job is information for specifying and identifying a plurality of jobs inputted in the specific job issuing software. They are determined by the job issuing software itself. To distinguish it from other jobs, there is a method of using a simple sequential number, the time information indicative of the time when the job is issued, or the like.

FIG. 13 is a diagram showing an example of the log information for recording generation of a specific event occurring in the peripheral apparatus a01 shown in FIG. 1 and information associated with the event generation. The peripheral apparatus a01 manages the log information of the job by using such a table.

In the embodiment, "log" denotes a mechanism for recording generation of the specific event occurring in the peripheral apparatus a01 and the information associated with it. As a specific event, there is completion of the job, occurrence of a jam or an error, or the like. One record is used every generation of the specific event and the information is recorded. The log regarding the completion of the job related to the invention will be described here.

In FIG. 13, records 1 to n (201 to 20n) of the log information are areas of the limited number prepared in the RAM b02 or DISK b04 in the peripheral apparatus a01. When the job process is completed in the peripheral apparatus a01, the information regarding the job is written into one record by the processing flow shown in FIGS. 8A and 8B. Since the number of records is limited, when a predetermined number of records are written, they are additionally written to the oldest written record.

The information table 204 is a table of the information recorded in one record of the log information. As an example of the information to be recorded here, there are mentioned: a recording date/time 211 of the log; input time 212 of the job; job completion time 213; the processing result 214 of the job; a job name 215; the job ID information 216; and an execution priority 217. As other information, various information such as amount of resources used by the job, job requester, and the like is recorded. Naturally, the job name 215, job ID information 216, execution priority 217, and the like correspond to the job name e11, job ID information e12, execution priority e14, and the like as job attributes of the same names, respectively.

Figure 14:
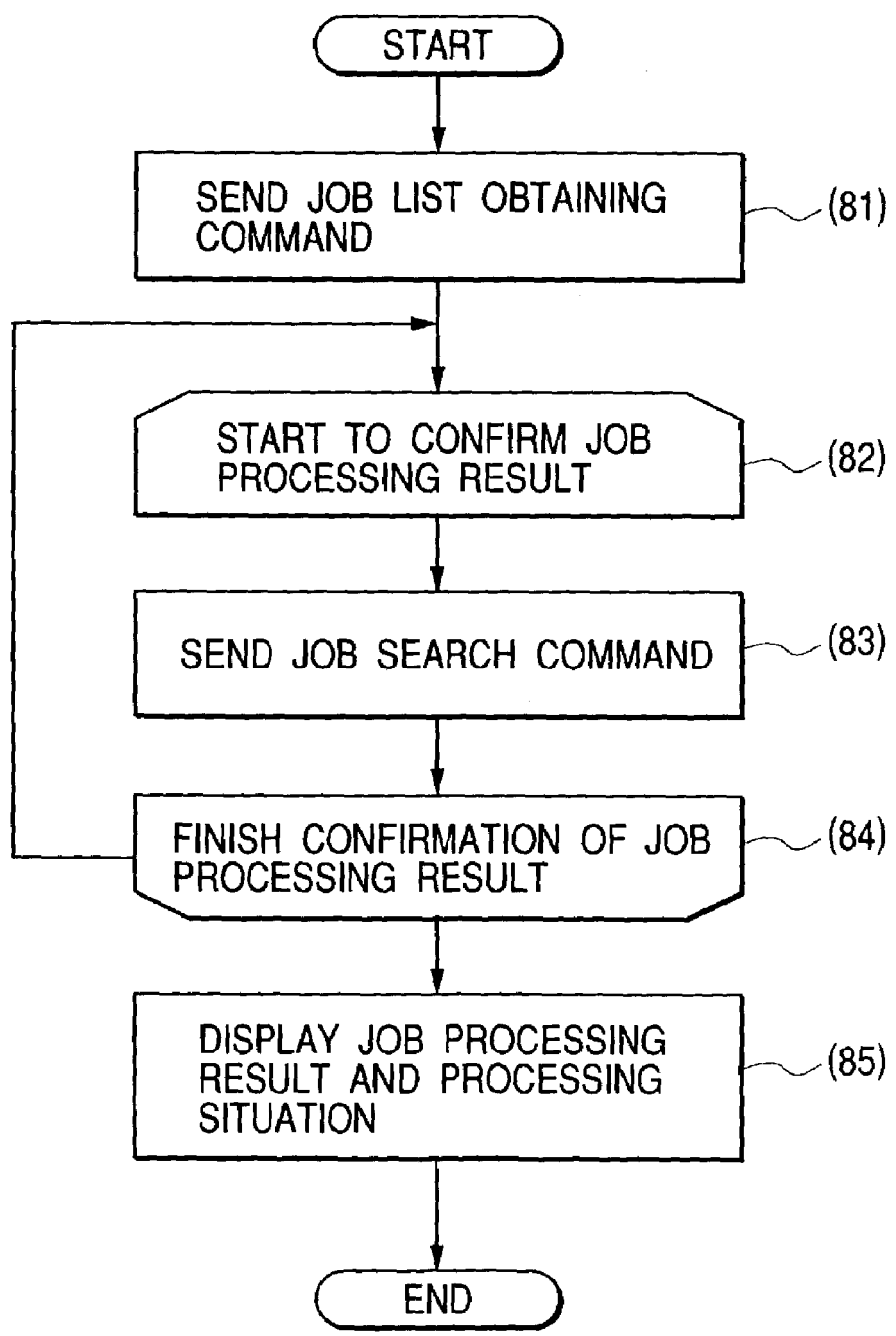
FIG. 14 is a flowchart showing an example of a seventh data processing procedure according to the invention.

FIG. 14 is a flowchart showing an example of a seventh data processing procedure according to the invention. This flowchart corresponds to the confirmation processing flow of the job processing result which is processed in the information processing apparatus shown in FIG. 1. The confirmation of the job processing result is made by job monitoring software and this processing flow is processed by the job monitoring software. Both of the case where the job monitoring software operates in the peripheral apparatus a01 and the case where it likewise operates in the PCs a02 to a04 are incorporated in a range to which the invention can be applied. Reference numerals (81) to (85) denote processing steps, respectively.

First, in step (81), the job list obtaining command is sent to the peripheral apparatus a01 serving as a target of the job monitoring. The job list obtaining command has been designated so as to obtain the job ID information e12 of the job attribute. Thus, a list of the jobs which are operating in the peripheral apparatus a01 and their job ID information can be obtained.

It is also possible to construct in a manner such that the job ID information of the job issued by the job issuing software is obtained as a list in cooperation with the job issuing software. When the job list is obtained, attributes such as job name e11, job processing situation e21, and the like can be obtained together with the job ID information e12.

Subsequently, in steps (82) to (84), the processes are repetitively executed with respect to each of the job ID information obtained in step (81). In step (82), the above repetitive process is started.

In step (83), the job search command in which the job ID information obtained in step (81) has been parameter-designated is sent to the peripheral apparatus a01. The peripheral apparatus a01 returns a result of the job search command in accordance with the processing flows described in FIGS. 6 and 10. The job monitoring software holds the search result and stores a processing result and a processing situation of each job.

In step (84), the above repetitive process is finished. In this step, whether the unconfirmed information in the job ID information obtained in step (81) still exists or not is discriminated. If it is determined that the unconfirmed information still exists, the processing routine is returned to step (82). If it is determined that the unconfirmed information does not exist, the processing routine advances to step (85).

Figure 15:
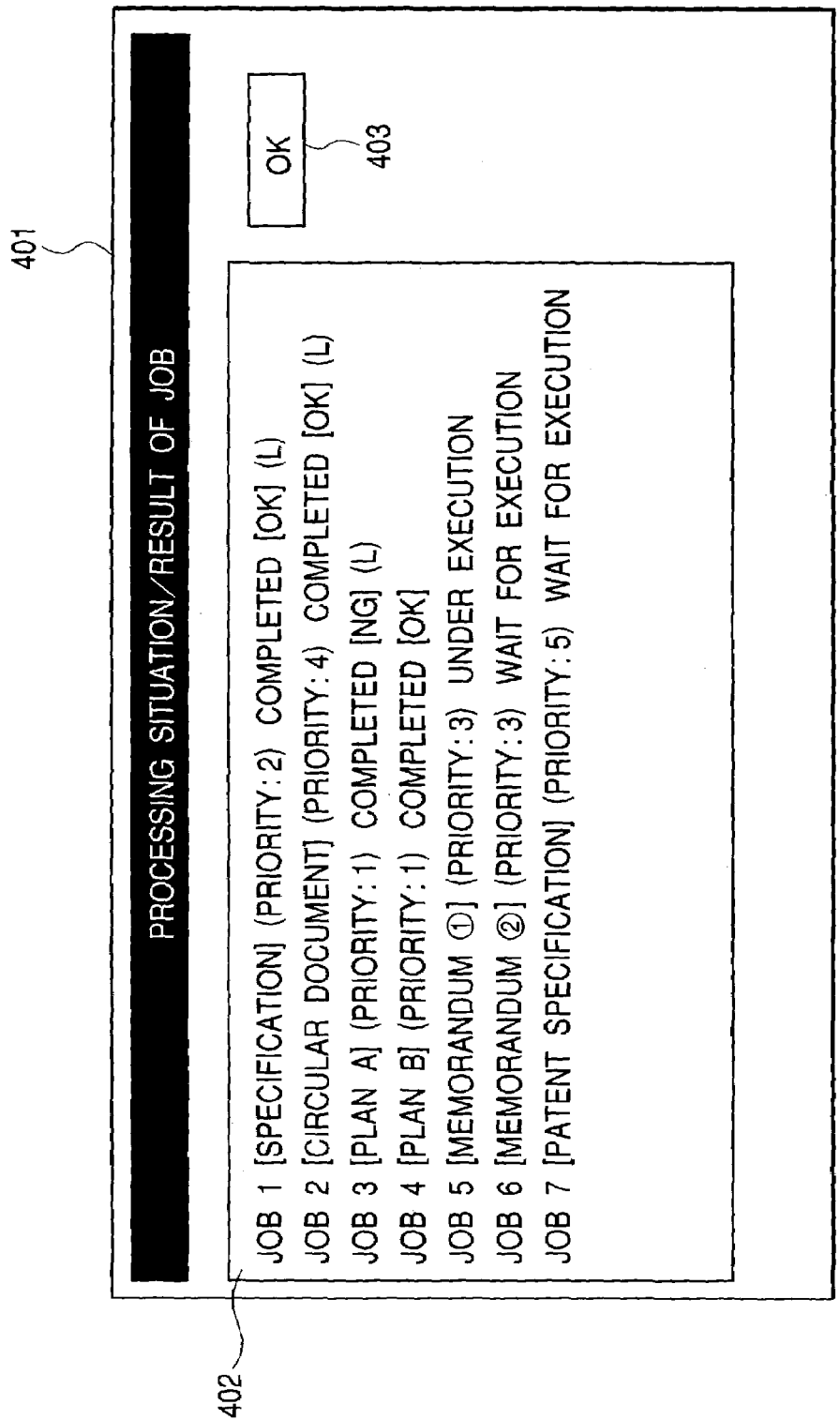
FIG. 15 is a diagram showing an example of a display screen for displaying processing results and processing situations of jobs in the information processing apparatus according to the invention.

In step (85), a processing result and a processing situation of each job obtained in step (83) are displayed on a display screen of a display device in a format shown in FIG. 15. In this display, if the job monitoring software operates in the peripheral apparatus a01, they are displayed on the LCD b05. If it operates in the PCs a02 to a04, they are displayed on the CRT c05. After those processes are executed, the present processing flow is finished.

FIG. 15 is a diagram showing an example of the display screen for displaying the processing results and the processing situations of the jobs in the information processing apparatus according to the invention.

The display screen is used when the job monitoring software displays the processing results and the processing situations of the jobs.

The display screen is displayed on the LCD b05 of the peripheral apparatus a01 or on the CRT c05 of each of the PCs a02 to a04. Both of the case where the job monitoring software operates in the peripheral apparatus a01 and the case where it likewise operates in the PCs a02 to a04 are incorporated in a range to which the invention can be applied.

Various user inputs (depression of a button, scroll of the list, etc.) are performed via the keyboard b06 of the peripheral apparatus a01 or the keyboard c06 and pointing device c07 of each of the PCs a02 to a04.

In FIG. 15, reference numeral 401 denotes a title showing a brief explanation of the display screen and showing that the display screen is used to display "processing situation/processing result of the job".

Reference numeral 402 denotes a list box. It is possible to construct the list box in a manner such that the job monitoring software displays a list of jobs received by the peripheral apparatus a01 which is monitored or the job issuing software which operates in cooperation with the job monitoring software displays a list of all jobs inputted to the peripheral apparatus a01. Reference numeral 403 denotes an OK button for deleting the display screen and returning it to another processing display screen.

In this example, the display screen displays: job numbers (job 1 to job 7) in the peripheral apparatus a01; a job name set in each job (the job name e11 of the job attribute shown in FIG. 5 or the job name 215 of the log information shown in FIG. 13); an execution priority (the execution priority e14 of the job attribute shown in FIG. 5 or the execution priority 217 of the log information shown in FIG. 13); processing results of the jobs (completed "OK", completed "NG") or processing situations of the jobs (under execution, wait for execution); and a mark (L) showing that the above information such as the job number has been found in the log information of FIG. 13.

The above display contents can be properly adjusted in accordance with request specifications of the job monitoring software or the job attribute or the log information which can be obtained/set. The job attribute or the log information which can be obtained/set can be obtained from the attribute showing the ability of the peripheral apparatus a01.

A construction of data processing programs which can be read out by the information processing apparatus according to the invention will be described hereinbelow with reference to memory maps shown in FIGS. 16 and 17.

FIG. 16 is a diagram for explaining the memory map in a memory medium for storing various data processing programs which can be read out by the peripheral apparatus a01 according to the invention.

FIG. 17 is a diagram for explaining the memory map in a memory medium for storing various data processing programs which can be read out by the PCs a02 to a04 according to the invention.

Although not particularly shown, there is also a case where information to manage the group of programs which are stored into the memory medium, for example, version information, implementors, and the like are also stored and information depending on the OS or the like on the program reading side, for example, icons to identify and display the programs and the like are also stored.

Further, data depending on the various programs is also managed on the directories. There is also a case where a program to install the various programs into a computer or, in the case where the installing program has been compressed, a program for decompressing it and the like are stored.

In FIG. 16, the functions shown in FIGS. 6 to 11 and 14 in the embodiment can be executed by the CPU b01 in the peripheral apparatus a01 in accordance with a program which is installed from the outside. In FIG. 17, the functions shown in FIGS. 11 and 14 in the embodiment can be also executed by the CPU c01 in each of the PCs a02 to a04 in accordance with the program which is installed from the outside. In this case, the invention is applied even to a case where information group including the program is supplied to an outputting apparatus from a memory medium such as CD-ROM, flash memory, FD, or the like or from an external memory medium via a network.

Naturally, the objects of the invention are accomplished by a method whereby the memory medium in which program codes of the software to realize the functions of the embodiments mentioned above have been recorded as mentioned above is supplied to a system or an apparatus and a computer (or a CPU or an MPU) of the system or apparatus reads out and executes the program codes stored in the memory medium.

In this case, the program codes themselves read out from the memory medium realize the novel functions of the invention and the memory medium in which the program codes have been stored constructs the invention.

As a memory medium to supply the program codes, for example, a flexible disk, a hard disk, an optical disk, a magnetooptic disk, a CD-ROM, a CD-R, a magnetic tape, a non-volatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes, and the functions of the embodiments mentioned above are realized by those processes.

Further, naturally, the invention also incorporates a case where the program codes read out from the memory medium are written into a memory provided for a function expanding board inserted in a computer or a function expanding unit connected to a computer, thereafter, a CPU or the like provided for the function expanding board or the function expanding unit executes a part or all of actual processes on the basis of instructions of the program codes, and the functions of the embodiments mentioned above are realized by those processes.

As described above, according to the invention, the user can grasp information regarding the job requested to the peripheral apparatus during the job process or within a predetermined period after the job process without burdening the system resources or compelling a traffic burden on the network.

What is claimed is:

1. A job processing apparatus for processing a job, comprising:

a management information storing unit for storing information showing a function which is used in a process of a job or information showing a processing situation of the job as management information of the job in association with job identification information for identifying the job before completion of the process of the job;

a log information storing unit for storing a function which is used in a process of a job or information showing a processing result of the job as log information of the job in association with job identification information for identifying the job after completion of the process of the job;

a searching unit for searching the management information or the log information corresponding to designated job identification information for identifying a job from the management information stored by said management information storing unit and the log information stored by said log information storing unit; and a transmitting unit for transmitting the management information or the log information found by the search of said searching unit.

2. An apparatus according to claim 1, wherein if an amount of the stored log information reaches a predetermined amount, said log information storing unit stores new log information in place of the old log information.

3. An apparatus according to claim 1, further comprising:

a job receiving unit for forming a management information storing area into said management information storing unit in response to a reception of a control command showing an input of the job; and an attribute setting unit for obtaining the information showing the function from a control command showing an attribute of the job and storing the information showing the function into the management information storing area in said management information storing unit.

4. An apparatus according to claim 1, further comprising an obtaining unit for obtaining the job identification information from a control command transmitted from an outside source, wherein said management information storing unit stores the information showing the function or the information showing the processing situation of the job in association with the job identification information obtained by said obtaining unit.

5. An information search method which is executed in a job processing apparatus for processing a job, comprising:

a management information storing step of storing information showing a function which is used in a process of a job or information showing a processing situation of the job as management information of the job in association with job identification information for identifying the job before completion of the process of the job;

a log information storing step of storing information showing a function which is used in a process of a job or information showing a processing result of the job as log information of the job in association with job identification information for identifying the job after completion of the process of the job;

a searching step of searching the management information or the log information corresponding to job identification information for identifying a job from the management information stored in said management information storing step and the log information stored in said log information storing step; and a transmitting step of transmitting the management information or the log information found by the search in said searching step.

6. A method according to claim 5, wherein in said log information storing step, if an amount of the stored log information reaches a predetermined amount, new log information is stored in place of the old log information.

7. A method according to claim 5,
wherein in said management information storing step, the information showing the function or the information showing the processing situation of the job is stored in a management information table, and
in said log information storing step, the information showing the function or the information showing the processing result of the job is stored in a log information table.

8. A method according to claim 7, further comprising:
a job receiving step of forming a management information storing area into the management information table in response to a reception of a control command showing an input of the job; and
an attribute setting step of obtaining the information showing the function which is used in the process of the job from a control command showing an attribute of the job and storing the information showing the function which is used in the process of the job into the management information storing area in said management information table.

9. A method according to claim 5, further comprising an obtaining step of obtaining the job identification information from a control command transmitted from an outside, and
wherein in said management information storing step, the information showing the function or the information showing the processing situation of the job is stored in association with the job identification information obtained in said obtaining step.

10. A computer-readable medium encoded with a computer program for controlling a job processing apparatus for processing a job, wherein said program allows a computer to execute:

a management information storing step of storing information showing a function which is used in a process of a job or information showing a processing situation of the job as management information of the job in association with job identification information for identifying the job before completion of the process of the job;

a log information storing step of storing information showing a function which is used in a process of a job or information showing a processing result of the job as log information of the job in association with job identification information for identifying the job after completion of the process of the job;

a searching step of searching the management information or the log information corresponding to job identification information for identifying a job from the management information stored in said management information storing step and the log information stored in said log information storing step; and a transmitting step of transmitting the management information or the log information found by the search in said searching step.

* * * * *

UNITED STATES PATENT AND TRADEMARK OFFICE
CERTIFICATE OF CORRECTION

| | | |
|---|---|---|
| PATENT NO. | : 7,307,746 B2 | Page 1 of 1 |
| APPLICATION NO. | : 10/397312 | |
| DATED | : December 11, 2007 | |
| INVENTOR(S) | : Takashi Inoue | |

It is certified that error appears in the above-identified patent and that said Letters Patent is hereby corrected as shown below:

COLUMN 7

Line 6, "etc,)" should read --etc.)--.

COLUMN 11

Line 26, "be also" should read --also be--.

COLUMN 15

Line 15, "be also" should read --also be--.

COLUMN 17

Line 31, "outside," should read --outside source,--.

Signed and Sealed this

Seventh Day of October, 2008

JON W. DUDAS
*Director of the United States Patent and Trademark Office*